United States Patent
Ross, Jr. et al.

(10) Patent No.: US 8,310,360 B2
(45) Date of Patent: Nov. 13, 2012

(54) PHYSICAL SECURITY DEVICE

(75) Inventors: Charles A. Ross, Jr., Olathe, KS (US);
Steve L. Phillips, Olathe, KS (US);
Keith E. Pierce, Stilwell, KS (US)

(73) Assignee: Guardian 8 Corporation, Scottsdale, AZ (US)

( * ) Notice: Subject to any disclaimer, the term of this patent is extended or adjusted under 35 U.S.C. 154(b) by 737 days.

(21) Appl. No.: 12/490,461

(22) Filed: Jun. 24, 2009

(65) Prior Publication Data

US 2009/0315703 A1    Dec. 24, 2009

Related U.S. Application Data

(60) Provisional application No. 61/075,089, filed on Jun. 24, 2008.

(51) Int. Cl.
*G08B 1/08* (2006.01)
*G08B 23/00* (2006.01)
*H04M 11/04* (2006.01)

(52) U.S. Cl. ............. 340/539.11; 340/539.1; 340/573.1; 455/404.1; 455/90.1

(58) Field of Classification Search .............. 340/539.11
See application file for complete search history.

(56) References Cited

U.S. PATENT DOCUMENTS

| | | | |
|---|---|---|---|
| 4,449,474 A | 5/1984 | Mariol | |
| 4,837,559 A | 6/1989 | Green, Sr. | |
| 5,604,483 A | 2/1997 | Giangardella et al. | |
| 5,629,679 A | 5/1997 | Cranford et al. | |
| 5,726,660 A * | 3/1998 | Purdy et al. | 342/357.75 |
| 5,903,219 A | 5/1999 | Chen | |
| 5,949,338 A * | 9/1999 | Masi et al. | 340/573.1 |
| 6,052,052 A * | 4/2000 | Delmonaco | 340/539.11 |
| 6,225,901 B1 * | 5/2001 | Kail, IV | 340/539.11 |
| 7,382,247 B2 * | 6/2008 | Welch et al. | 340/539.12 |
| 7,844,248 B2 * | 11/2010 | Sotack | 455/404.1 |
| 2005/0068171 A1 * | 3/2005 | Kelliher et al. | 340/539.22 |

* cited by examiner

*Primary Examiner* — Donnie Crosland

(57) ABSTRACT

A security device paired with a user's cell phone is operable by either a trigger or an accelerometer. The device includes visual and audio alarms, a prerecorded message and an audio recording of the ambient noise. Depression of the trigger will spray mace onto an attacker, activate the alarms and alternately send the message and recording to 9-1-1 or other security monitor. Alternatively, the accelerometer will so activate the device. The alarms and transmissions are synchronized so as to not interfere one with the other. Direct communication with 9-1-1 via the Bluetooth®/cell phone interface is immediately established either by a push-to-talk button or at the termination of a predetermined alarm and message transmission period.

4 Claims, 10 Drawing Sheets

*FIG 9*

21
SPKR GRILLE

*FIG 10*

25
CLIP BELT
25

13
12
HOUSING BOTTOM CAP

14
HOUSING KUBATON
14

CONTACT 13  *FIG 13*

12
HOUSING BOTTOM CAP
14
HOUSING KUBATON

*FIG 14*
18
LENS STROBE

FIG 21
CHARGING CRADLE 27
110 VAC TO 12 V 29
FIG 23

FIG 22
PLUG 12 VOLT

NOTE: CIGAR PLUG- PLUGS INTO CRADLE OR DIRECTLY INTO PSG
28
12 VOLT CIGAR PLUG

PLUG 12 VOLT

FIG 24

PHYSICAL SECURITY DEVICE

CROSS-REFERENCE TO RELATED APPLICATION

This application claims the benefit of provisional application Ser. No. 61/075,089, filed Jun. 24, 2008, entitled "Improved Physical Security Device."

BACKGROUND OF THE INVENTION

This invention relates to a security device and, more particularly, to a device presenting countermeasures to defend against personal attacks, including alarms to frighten the attacker and/or alert others, as well as audio and visual communications advising others of the incident.

The desire for personal security is a burgeoning one resulting in personal security devices being available on the marketplace. Such devices range from weapons designed to inflict harm on an attacker to alarms designed to call attention to the situation at hand so as to dissuade an attacker from further aggression.

Although such devices are assumably effective in operation, it is desirable to have a device which presents a plurality of security functions which allows the user to defend against dangerous situations and communicate the impending situation in various audio and visual forms to others.

In response thereto we have invented a personal security device which presents a plurality of security features including weapon-type functions, visual and audio alarms and audio and visual recordings for transmission to 9-1-1 or other preselected numbers. Such functions may either be initiated by the user or automatically activated during physical confrontations. The device is in the form of a pistol configuration which enables the user to better manipulate the device and control the available functions.

It is therefore a general object of this invention to provide a security device presenting a plurality of security functions.

Another object of this invention is to provide a device, as aforesaid, which can inflict physical harm upon an attacker.

Still another object of this invention is to provide a device, as aforesaid, which activates audio and/or visual alarms so as to call attention to the altercation and/or frighten the attacker.

Another object of this invention is to provide a device, as aforesaid, which enables the user to accurately direct mace upon the attacker and mark the attacker with a tracer substance to assist in subsequent identification.

A still further object of this invention is to provide a device, as aforesaid, which links with a cell phone so as to automatically alert 9-1-1 and/or send prerecorded audio messages as well as audio and visual recordings of the altercation to 9-1-1 or other preselected numbers.

Another object of this invention is to provide a security device, as aforesaid, which repeatedly transmits the audio/or visual recordings.

A still further object of this invention is to provide a security device, as aforesaid, which provides a direct voice communication link with 9-1-1 or other preselected numbers.

A further object of this invention is to provide a device, as aforesaid, which can be user activated or automatically activated if the item is thrown at the attacker or jostled during an altercation.

Other objects and advantages of this invention will become apparent from the following description taken in connection with the accompanying drawings, wherein is set forth by way of illustration and example, a now preferred embodiment of this invention.

DESCRIPTION OF THE PREFERRED EMBODIMENT

Figures 1, 2:
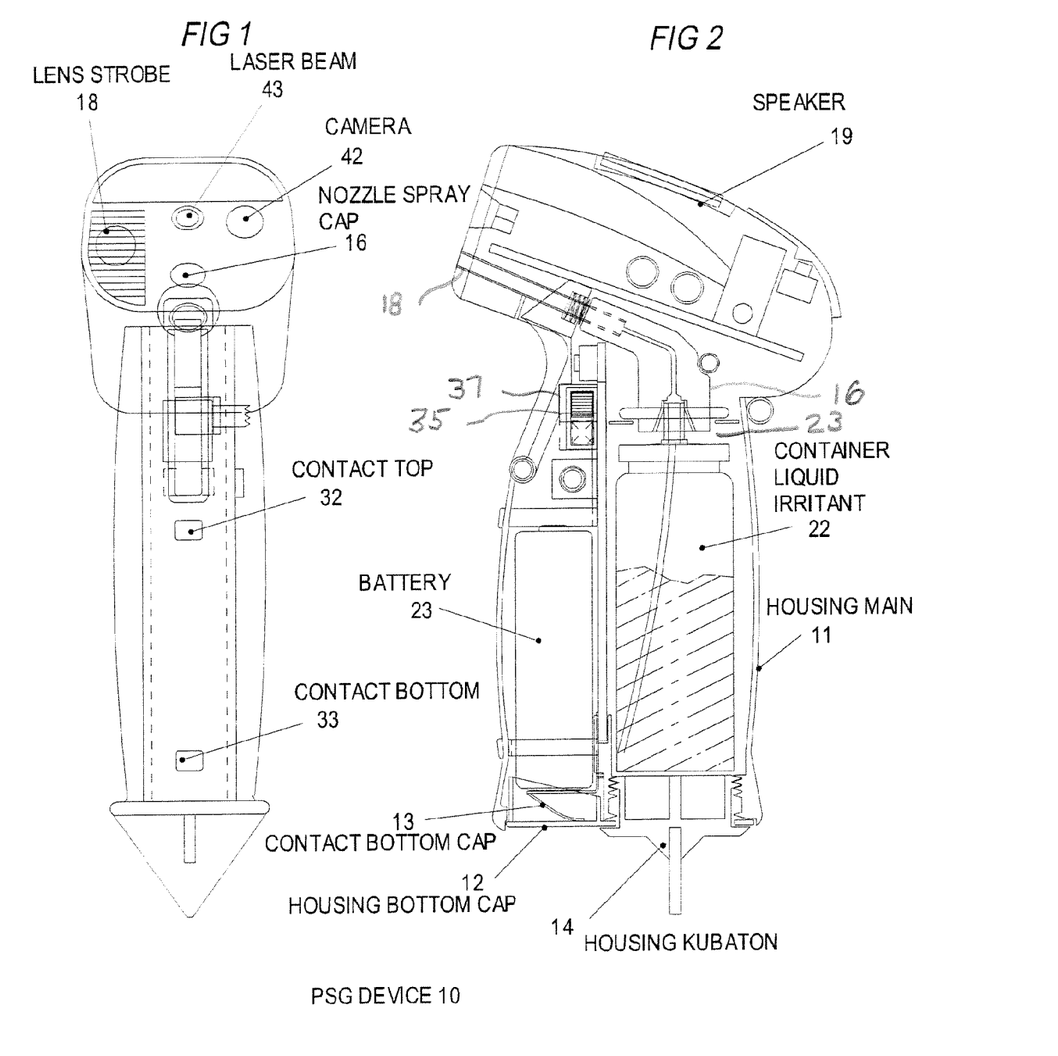
FIG. 1 is a front view of the security device.
FIG. 2 is a side view of the FIG. 1 security device with a sidewall removed to show the interior components.
Figure 3:
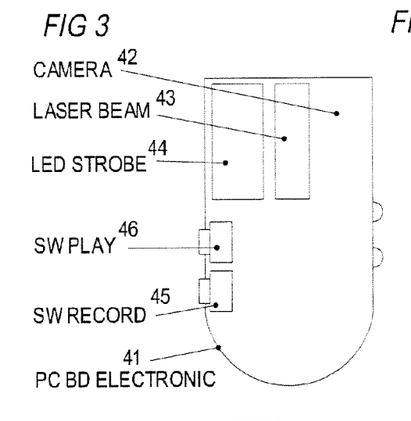
FIG. 3 is a front view of the electronics PC board located in the housing body and diagrammatically showing various components thereon.
Figures 3A, 3B:
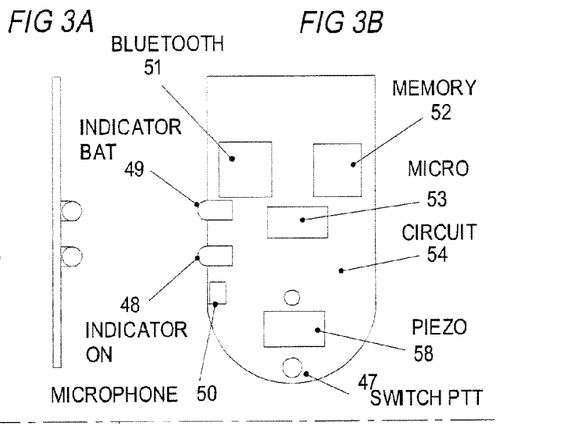
FIG. 3A is a side view of the electronics PC board located in the housing body and diagrammatically showing various components thereon.
FIG. 3B is a rear view of the electronics PC board located in the housing body and diagrammatically showing various components thereon.
Figures 4, 4A, 7, 8:
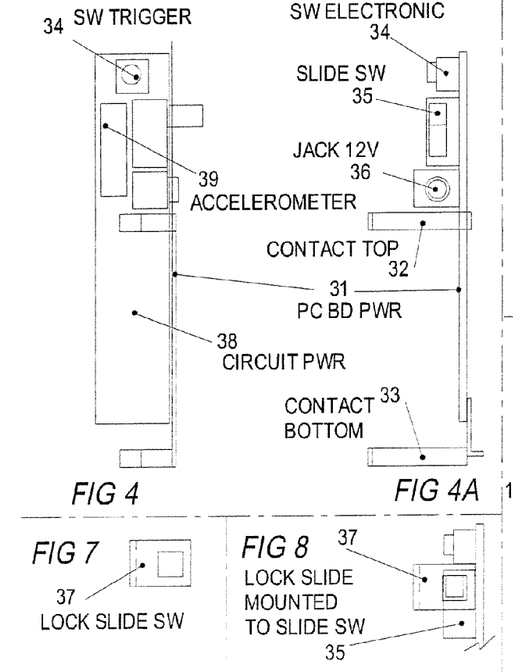
FIG. 4 is a front view of the power PC board located in the housing body diagrammatically showing various components thereon.
FIG. 4A is a side view of the power PC board located in the housing body diagrammatically showing various components thereon.
FIG. 7 is a side view of the lock slide switch for the trigger assembly.
FIG. 8 is a side view of the lock slide/switch assembly.
Figure 5:
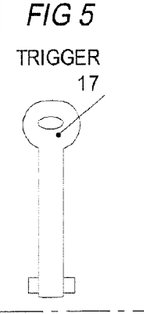
FIG. 5 is a front view of the trigger.
Figures 5A, 5B:
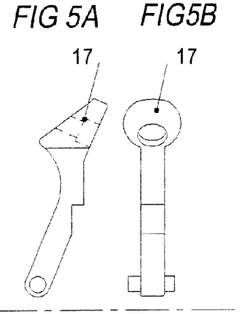
FIG. 5A is a side view of the trigger.
FIG. 5B is a rear view of the trigger.
Figures 15, 16:
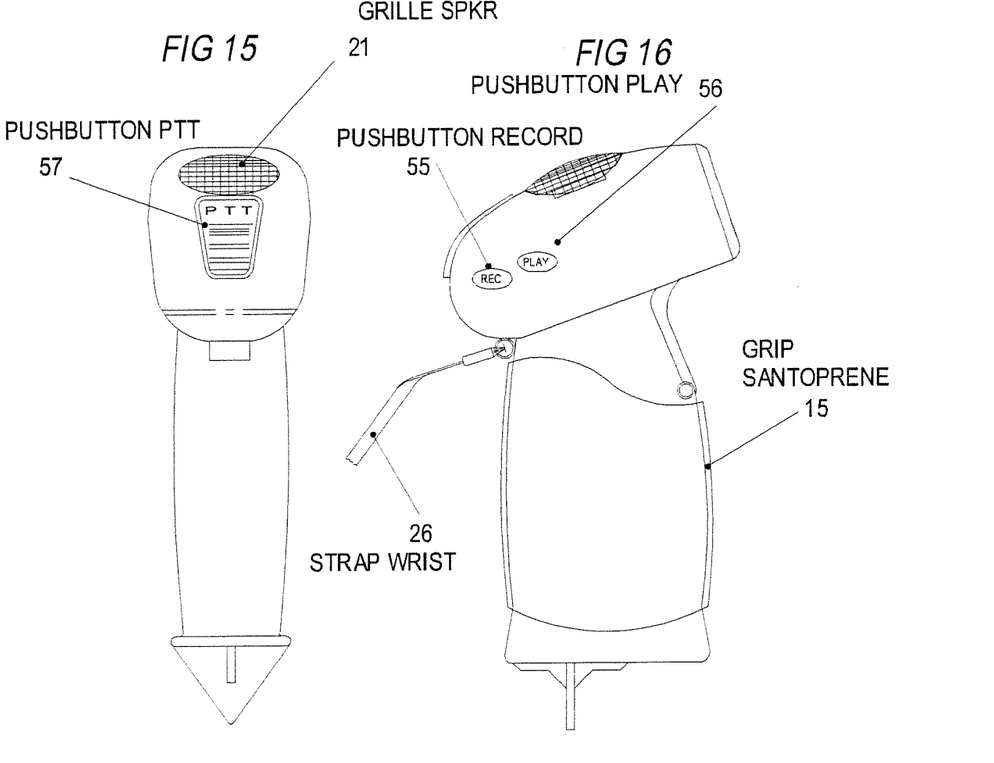
FIG. 15 is a rear view of the FIG. 1 device, on a reduced scale, highlighting the push to talk ("PTT") button.
FIG. 16 is an opposed side view of the device as shown in FIG. 2, highlighting the record and play buttons with the wrist strap as in FIG. 10A attached.
Figure 17:
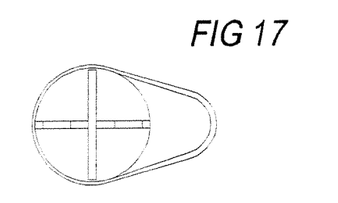
FIG. 17 is a bottom view of the housing of the FIG. 16 device showing the housing cap/Kubaton combination.
Figure 24:
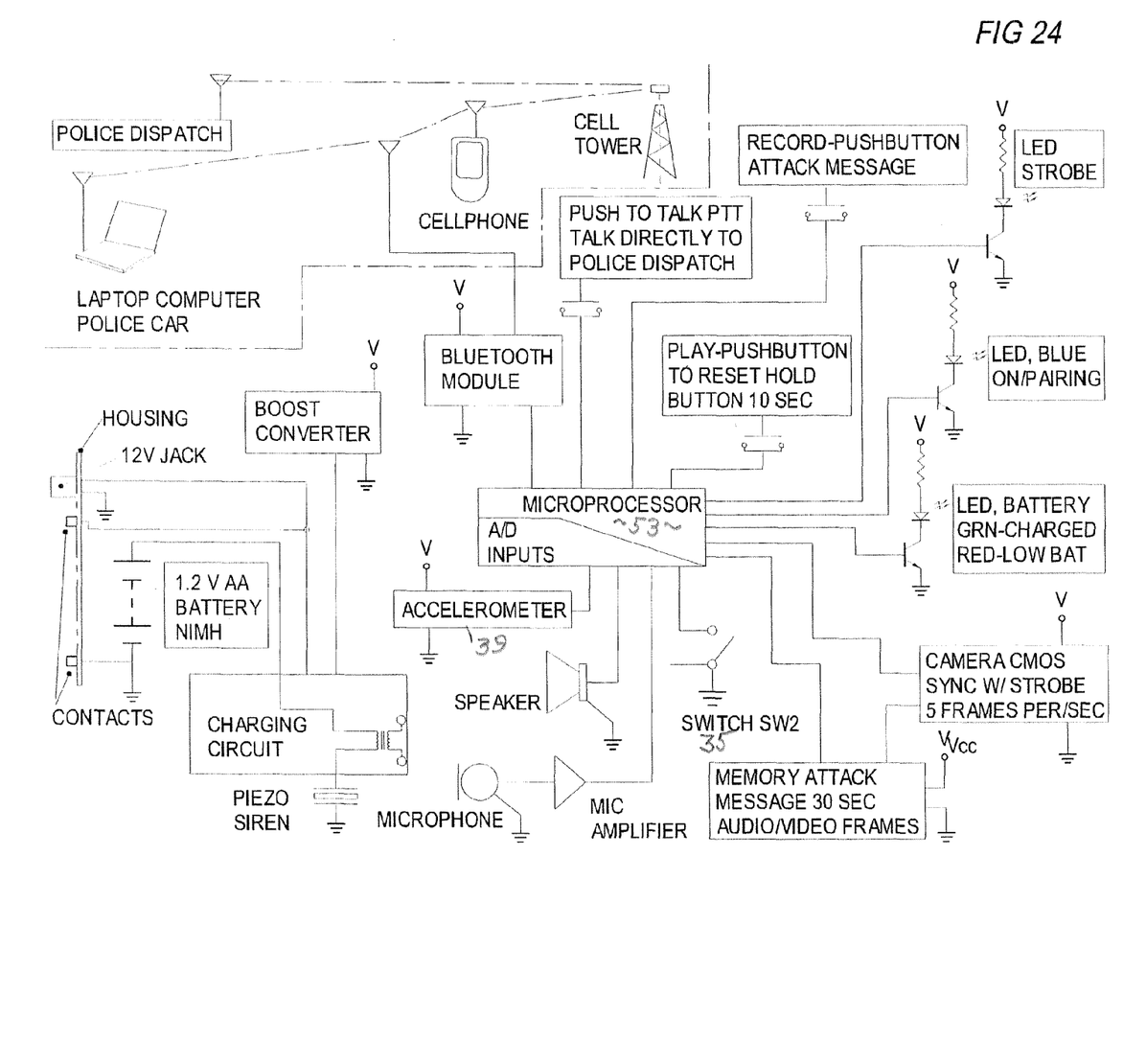
FIG. 24 is a block diagram showing the relationships among the various functions of the FIG. 1 device.
Figure 25:
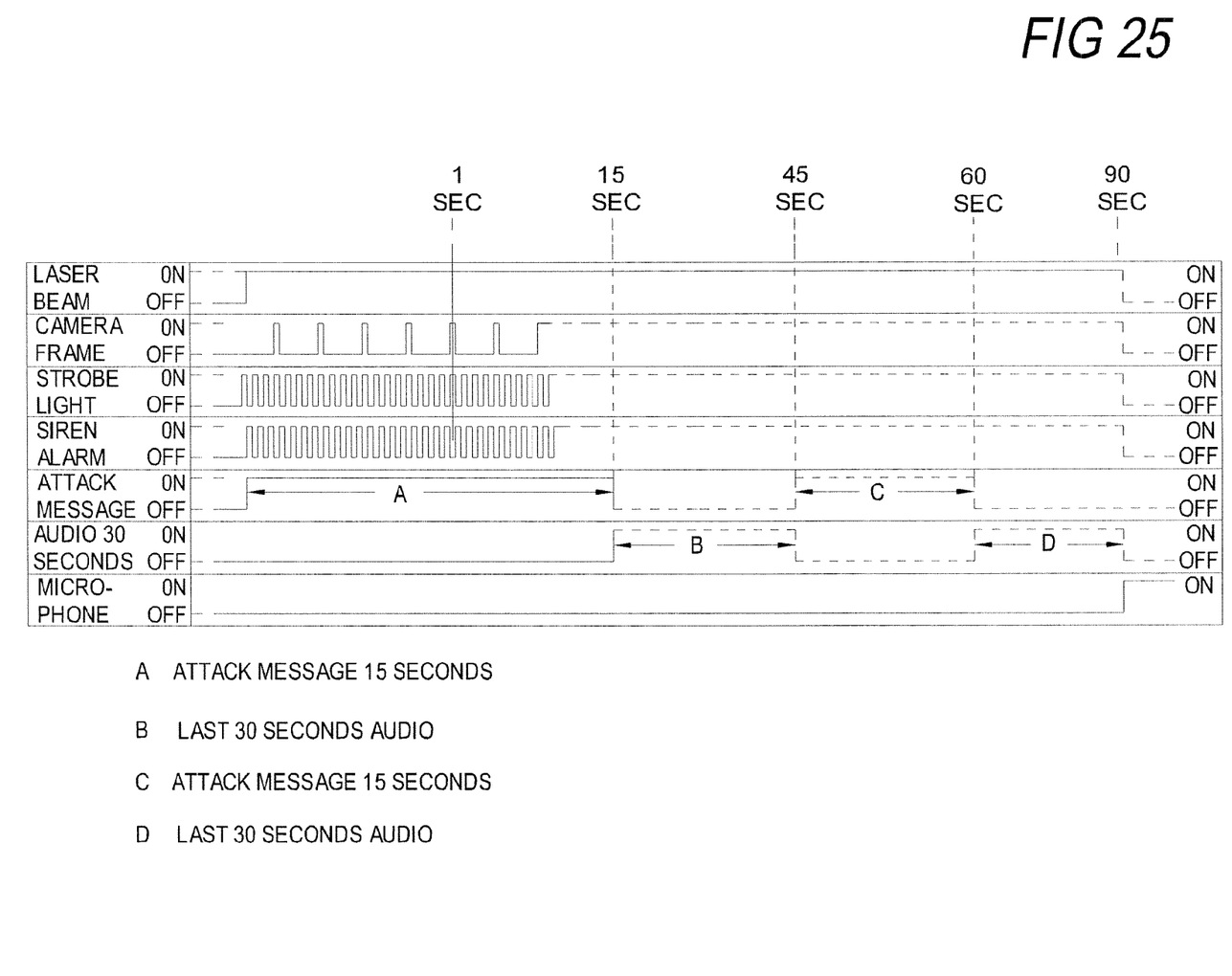
FIG. 25 illustrates a timing chart showing the synchronization among certain functions of the FIG. 1 device as controlled by the program software.

Turning more particularly to the drawings, FIGS. 2 and 16 show the device as utilizing a pistol-shaped housing 11 for containing the various to-be-described components therein. Such components include a power board 38 (FIGS. 4-4A) and an electronics PC board 41 as shown in FIGS. 3-3 B. Various functions are shown in FIG. 24 with the basic logic, as programmed into the microprocessor, being shown in FIG. 20. FIG. 25 shows the timing relationship among the various components. Battery 23, releasably insertable within the main housing 100, provides DC power for the PC power board 38. The battery 23 can be recharged by aligning the contacts 32, 33 with the charging cradle 27 contacts as shown in FIGS. 21-23. A transformer 29, as connected to a voltage source, may be connected to the cradle or directly to the power board at jack 36 (FIG. 4A).

Figures 18, 19:
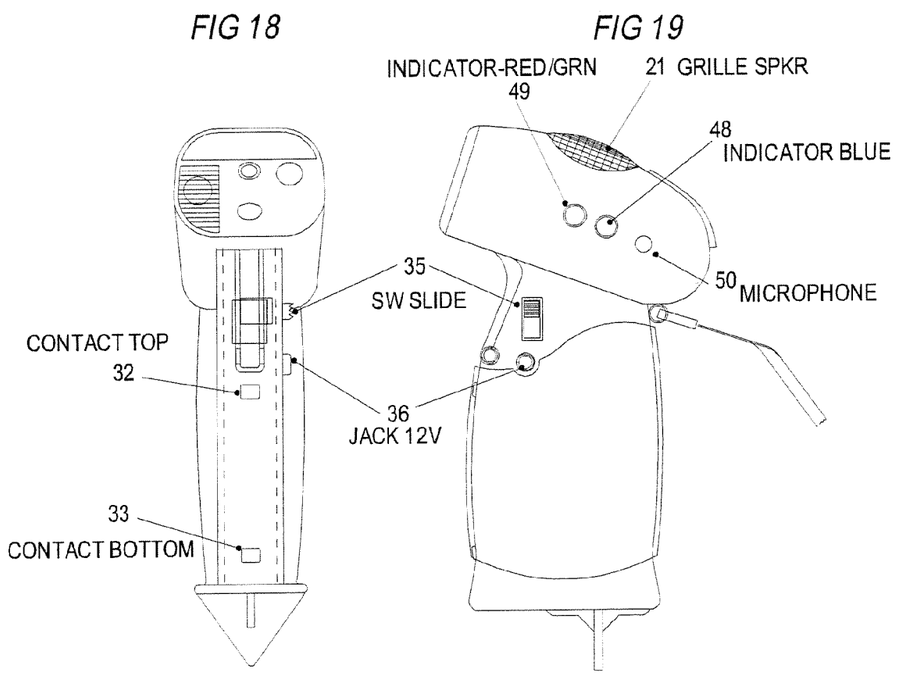
FIG. 18 is a front view of the FIG. 1 device on a reduced scale.
FIG. 19 is a side view of the FIG. 2 device on a reduced scale.

To initially power the security device the slide switch 35 is moved from a first OFF position to a second ON or armed position. A blue indicator 48 advises the user the device is armed (FIG. 19). Red/green indicator 49 advises the user of the extent of battery power with red showing low battery power. At this position ready power is provided for components on board 41, the activation of such components by the microprocessor 53 (Toshiba 32 bit MCU) to be subsequently described.

Figure 26:
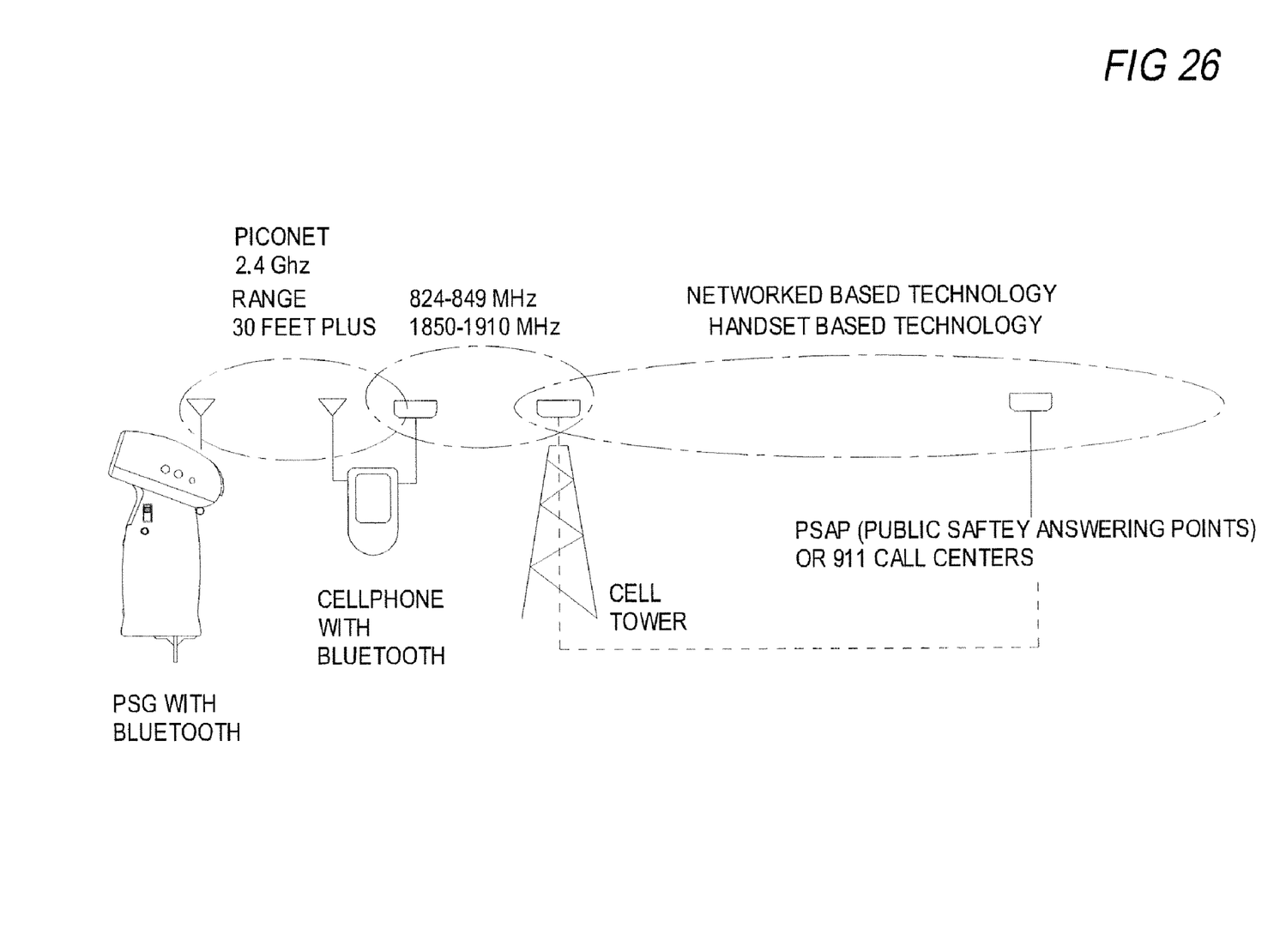
FIG. 26 is a diagrammatic view illustrating the Bluetooth® connection of the device with the user's cell phone for communication with a safety call center.

At the ON position the user initially establishes a communication channel between the Bluetooth® module 51 (Laird Technology-BISMII) and the user's cell phone (FIG. 26). This pairing is established by depression of the push to talk ("PTT") button 57 (FIG. 15) so as to pair/interface the cell phone or other communication device with the Bluetooth® module. The depression of the PTT button 57 is just one example to let the microprocessor recognize that a Bluetooth® pairing routine is to be established. It is understood that after this initial pairing routine that Bluetooth® communication will automatically occur upon subsequent arming (FIG. 20, 100).

Upon pairing, the microprocessor initiates operation of the RECORD module 52 so as to automatically record the ambient noise as picked up by the microphone 50 (Ventromic-OB4010). This recording is on a loop basis, i.e., a continuous 30-second loop recording of the ambient noise is being made.

Figure 20:
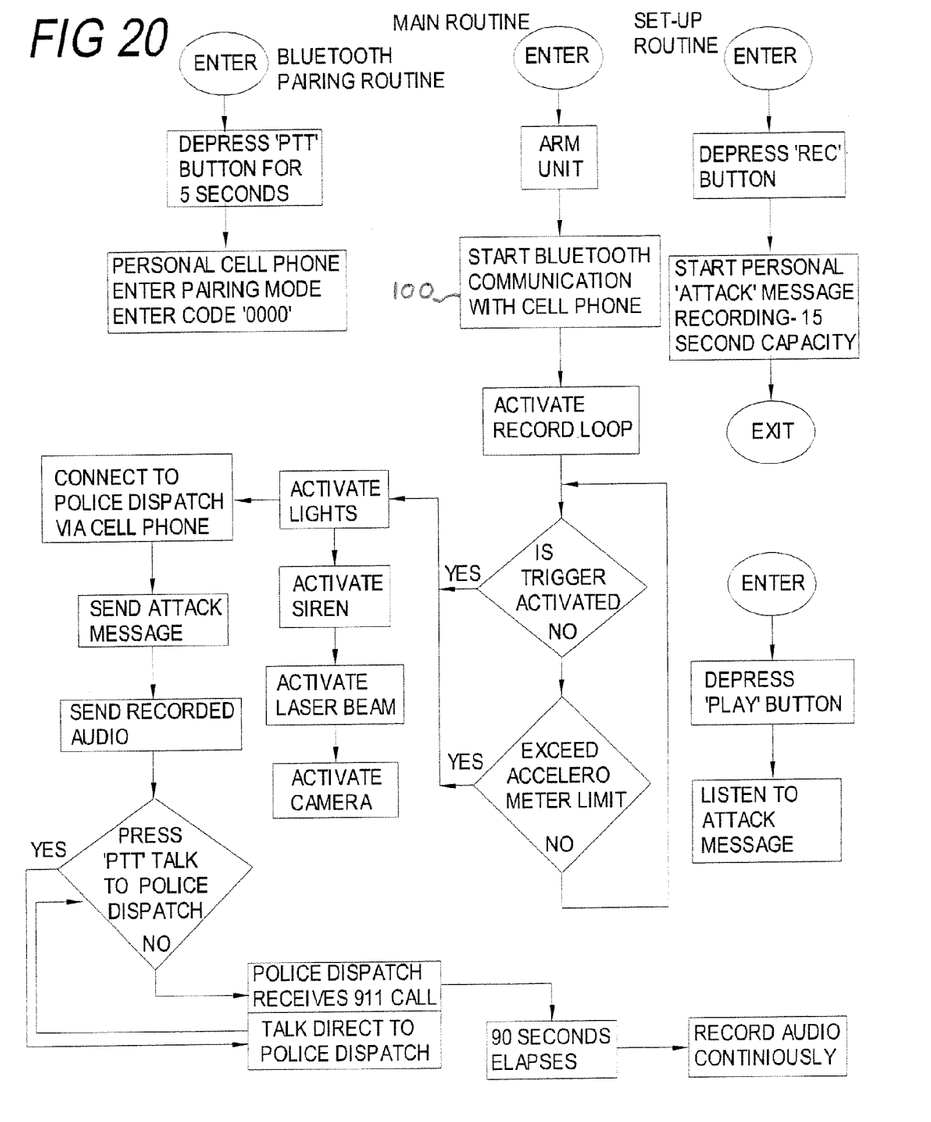
FIG. 20 is a basic block diagram showing the logic flow of the software of the microprocessor.
Figures 21, 22, 23:
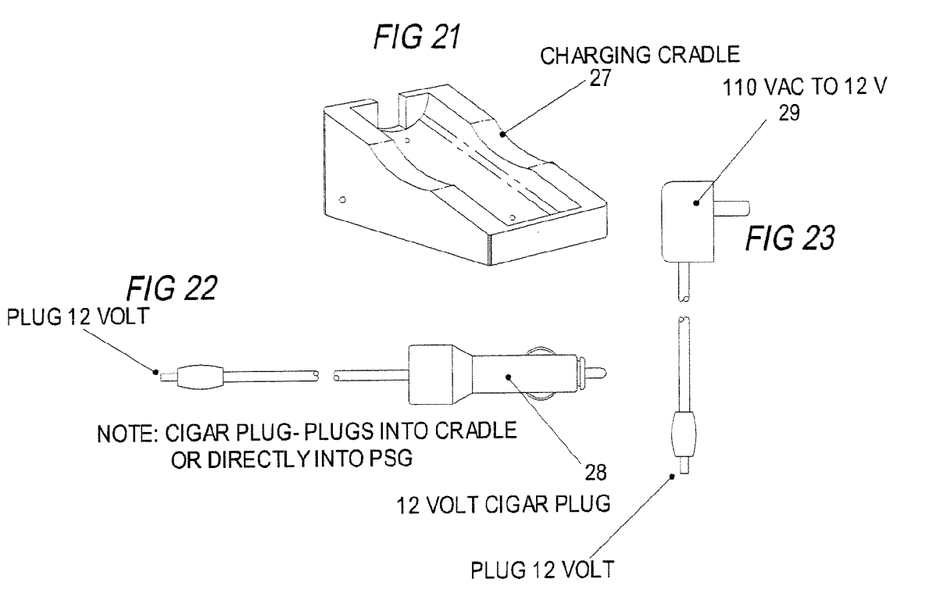
FIG. 21 is a view of the charging cradle for the security device.
FIG. 22 is a foreshortened view of the charging plug for the FIG. 21 cradle.
FIG. 23 is a foreshortened view of the transformer for charging.

Previously as shown in the set up routine of FIG. 20, the user is given the ability to record a personal message, such as the user's name, location, address, etc. This is provide by the microphone 50, RECORD switch 45 (Omron), PLAY switch 46 (Omron) and memory 52 (Toshiba-32 MB/64 MB). As such, the user first records the message upon depression of switch 45 and can playback the same upon depression of switch 46.

Also at this time, various other alarms and modules are at a ready position, including the camera module 42 (Toshiba-2MPTCM9200MD), the laser beam unit 43 (Luminex), the LED strobe 44 (Amostech-AL505012AZ) and audio alarm 58 (Ventronic-1.5V). All are awaiting activation as controlled by the microprocessor 53.

Upon movement of the slide switch 35 to its ON/armed position, depression of trigger 17 is possible. Trigger 17 has been pivotally mounted about its lower end within housing 11. At its FIG. 2 OFF position the slide lock 37 precludes movement of trigger 17 towards trigger switch 34. At its ON position the slide lock 37 is displaced from trigger 17 allowing for pivotal movement of trigger 17 into contact with switch 34.

Figures 6, 6A:
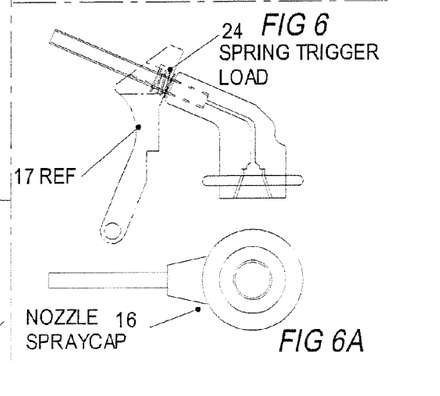
FIG. 6 illustrates a side view of the trigger assembly attached to a spray cap/nozzle of the mace canister.
FIG. 6A is a top view of the FIG. 6 trigger assembly.
Figure 9:
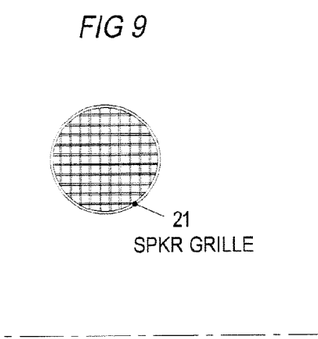
FIG. 9 is a front view of the speaker grill.
Figures 10, 10A:
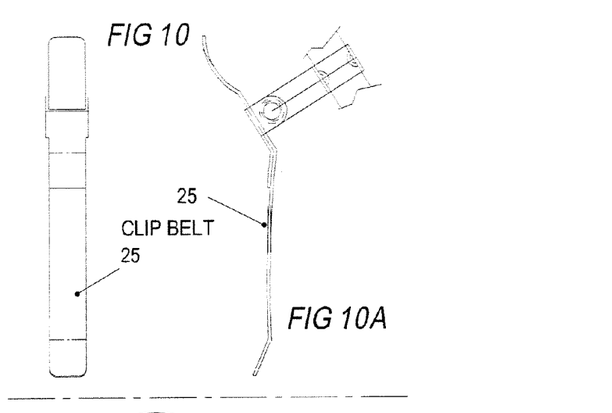
FIG. 10 is a front view of the clip belt for the device.
FIG. 10A is a side view of the FIG. 10 clip attached to the security device as fragmentarily shown.
Figure 11:
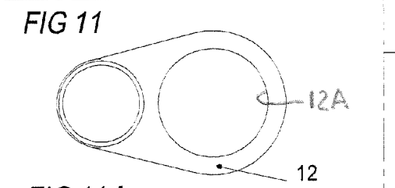
FIG. 11 is a top view of the housing bottom cap.
Figure 11A:
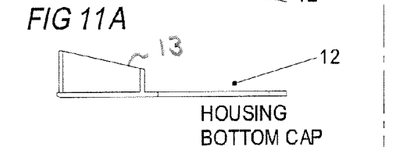
FIG. 11A is a side view of the housing bottom cap.
Figure 11B:
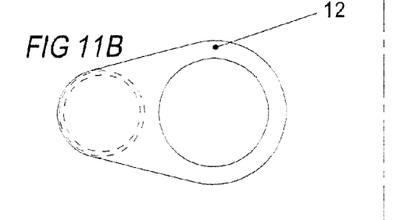
FIG. 11B is a bottom view of the housing bottom cap.

As shown in FIG. 6, the free end of trigger is mounted in a spring 24 loaded manner about an elongated nozzle 18. This tubular nozzle 18 extends into a nozzle housing spray cap 16. Trigger depression moves the elongated nozzle 18 to its dotted line position as shown in FIGS. 2 and 6. As such. valve 23 is opened allowing mace to be discharged from canister 22, through nozzle 18. and onto an attacker. The mace may have therein sufficient dye material so as to mark the attacker for subsequent identification. As above, depression of the trigger assembly for mace discharge engages switch 34 which allows the microprocessor to activate a number of components on the component board 41 as shown in FIG. 20.

As shown in FIG. 20 the logic circuitry activates the LED strobe module 44, the laser beam 43, siren 58 and camera 42 modules. The previously established Bluetooth® pairing enables the microprocessor to connect the user's cell phone with 9-1-1 or other preselected numbers. The microprocessor then sends the prerecorded voice message to the 9-1-1 dispatcher or other selected number. Concurrently, the last 30 seconds of the ambient audio, having been recorded by module 53, is saved and subsequently transmitted to 9-1-1 or other selected number.

The user can press the PTT button 57 to establish direct communication with the 9-1-1 dispatcher. If not, the messages will be alternately transmitted to 9-1-1 a second time in case the user is disabled (FIG. 25) It is understood that this repeated message transmission also enhances location of the cell phone to be established by known techniques. After this second transmission the alarms are discontinued and an open cell phone communication is maintained with the 9-1-1 police dispatcher. Continuous recording of audio transmitted to the security monitor by the user's cell phone is established either by the monitor or the record module. It is understood that depression of the PTT button 57 at any time will disengage the alarms and enable direct communication with the police or other security monitor.

Included in the power circuitry is an accelerometer 39 (Bosch-BMA150) which will also activate the above alarms in lieu of trigger 17 depression, such when the unit is thrown. jostled or dropped during an altercation. The degree of movement which will activate the accelerometer is chosen as a matter of device design. Accordingly, the device components need not be activated by user depression of the trigger assembly.

FIG. 25 illustrates a timing diagram of the various security alarms and components as controlled by the microprocessor 53. As such the multiple transmissions of the prerecorded message and the ambient audio message will not interfere with each other. The strobe light synchronization will not interfere with the function of the camera module 42 which is taking pictures of the ambient surroundings and storing the same for further recall or transmission to a security monitor. The strobe and siren alarms can also be alternated. As shown in FIG. 25 and above discussed, the messages are no longer transmitted after 90 seconds as the microphone remains on such that direct communication with 9-1-1 is established without interference with the alarms and messages. Again, these transmissions and alarms can be interrupted by the user by depression of the PTT button 57. Thus, interference with voice contact or ambient audio is precluded.

As shown in FIG. 26, the cell phone transmission is linked with at least one cell phone tower. It is understood that the cell phone location can be further established by known techniques as the cell phone is linked with various cell phone towers. Such location is enhanced by multiple transmissions of the prerecorded and ambient messages.

Figure 12:
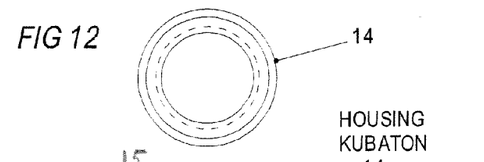
FIG. 12 is a top view of the Kubaton/inflector assembly.
Figures 12A, 12B:
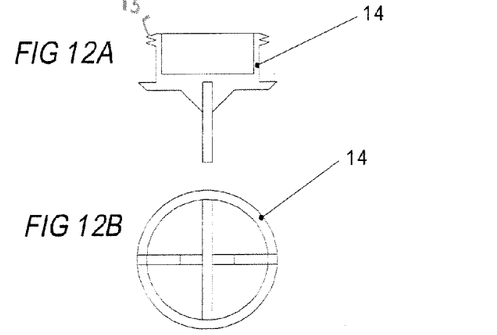
FIG. 12A is a side view of the inflector.
FIG. 12B is a bottom view of the inflector.
Figure 13:
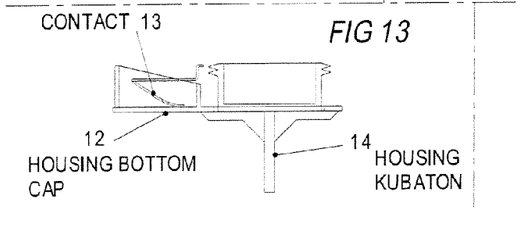
FIG. 13 is a side view of the housing cap/Kubaton combination.
Figure 14:
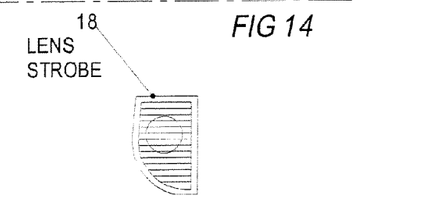
FIG. 14 illustrates a lens for the strobe LED from the front side thereof.

Also provided at one end of the housing 11 is a body inflector 14 known as a "Kubaton," designed to inflect pressure onto sensitive parts of an attacker's body. Inflector 14 presents threads 15 (FIG. 12A) and releasably projects through the aperture 12A found in the bottom cap 12 housing 11 for threadable engagement with threads in the interior of the housing 11. As shown, cap 12 includes a battery contact 13 for lower contact with battery 23. Removal of the Kubaton 14 allows for the housing bottom cap 12 to be removed enabling replacement of the battery and/or mace container 22 within the housing.

Accordingly, we have invented a security device which enables the user to establish communication with a security monitor whether purposefully or automatically. The availability of the various weapon type functions, alarms, camera and messages enhances the security afforded by the device. The synchronization among the various devices enhances the effectiveness of the various alarms and message communication with the repeated transmission of these prerecorded and ambient noise messages enhancing the ability to identify and locate the user.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A method, performed by a hand-held apparatus that is operated by a user having a voice, the method comprising:

providing a pistol grip so that the user can support and orient the apparatus while the apparatus performs the method;

recording the user's voice via a microphone of the apparatus so that a first message is stored in a memory of the apparatus;

playing the first message for user approval;

activating a countermeasure to defend the user against attack;

before activating, recording ambient sound via the microphone so that a second message is stored in the memory;

after activating, transmitting by wireless communication from the apparatus the first message and the second message to inform others about the user's need for assistance.

2. An apparatus for operation by a user having a voice, the apparatus comprising:

a housing comprising a pistol grip for the user to support and orient the apparatus;

a microphone in the housing;

a memory in the housing;

a recorder in the housing that records the user's voice so that a first message is stored in the memory and records ambient sound so that a second message is stored in the memory;

a countermeasure deployed from within the housing to defend the user against attack; and circuitry in the housing; wherein the circuitry plays the first message for user approval; and the circuitry, in response to activation by the user of the countermeasure, transmits by wireless communication the first message and the second message to inform others about the user's need for assistance.

3. The apparatus of claim 2 further comprising a lock switch assembly that blocks deployment of the countermeasure, and that enables the circuitry to transmit.

4. The apparatus of claim 3 wherein the countermeasure comprises mace for spraying onto an attacker.

\* \* \* \* \*